United States Patent [19]
Muehlbach et al.

[11] Patent Number: 5,124,391
[45] Date of Patent: Jun. 23, 1992

[54] FILLER-CONTAINING THERMOPLASTIC MOLDING MATERIALS

[75] Inventors: Klaus Muehlbach, Heppenheim; Walter Goetz, Ludwigshafen; Bertram Ostermayer, Heidelberg, all of Fed. Rep. of Germany

[73] Assignee: BASF Aktiengesellschaft, Ludwigshafen, Fed. Rep. of Germany

[21] Appl. No.: 578,775

[22] Filed: Sep. 7, 1990

[30] Foreign Application Priority Data

Sep. 7, 1989 [DE] Fed. Rep. of Germany ....... 3929687

[51] Int. Cl.$^5$ ............................ C08L 3/30; C08K 7/14
[52] U.S. Cl. ..................................... 524/420; 524/493; 524/494; 525/392; 525/397
[58] Field of Search ........................ 524/420, 493, 494; 525/397, 392

[56] References Cited

U.S. PATENT DOCUMENTS

| | | | |
|---|---|---|---|
| 4,255,321 | 3/1981 | Brussen | 525/132 |
| 4,824,915 | 4/1989 | Aycock et al. | 525/397 |
| 4,873,286 | 10/1989 | Gallucci et al. | 525/392 |
| 4,923,924 | 5/1990 | Grant et al. | 525/397 |
| 4,929,675 | 5/1990 | Abe et al. | 525/397 |

FOREIGN PATENT DOCUMENTS

| | | |
|---|---|---|
| 0046040 | 2/1982 | European Pat. Off. . |
| 0260123 | 3/1988 | European Pat. Off. . |
| 0314000 | 5/1989 | European Pat. Off. . |
| 2226932 | 12/1973 | Fed. Rep. of Germany . |
| 2186510 | 1/1974 | France . |
| 8105700 | 4/1982 | Netherlands . |
| WO8505372 | 12/1985 | PCT Int'l Appl. . |
| WO8602086 | 4/1986 | PCT Int'l Appl. . |
| WO8705304 | 9/1987 | PCT Int'l Appl. . |

Primary Examiner—Paul R. Michl
Assistant Examiner—T. McDonald, Jr.
Attorney, Agent, or Firm—Oblon, Spivak, McClelland, Maier & Neustadt

[57] ABSTRACT

Filler-containing thermoplastic molding materials containing, as essential components,
  A) from 10 to 84% by weight of a thermoplastic polyamide,
  B) from 10 to 84% by weight of a modified polyphenylene ether,
  C) from 5 to 40% by weight of a fibrous or particulate filler or a mixture thereof, and
  D) from 1 to 20% by weight of a zinc sulfide pigment, and, in addition,
  E) from 0 to 30% by weight of an impact-modifying rubber and
  F) from 0 to 25% by weight of a flameproofing agent, are described.

5 Claims, No Drawings

FILLER-CONTAINING THERMOPLASTIC MOLDING MATERIALS

The present invention relates to filler-containing thermoplastic molding materials containing, as essential components, A) from 10 to 84% by weight of a thermoplastic polyamide,
B) from 10 to 84.8% by weight of a modified polyphenylene ether,
C) from 5 to 40% by weight of a fibrous or particulate filler or a mixture thereof, and
D) from 1 to 20% by weight of a zinc sulfide pigment, and, in addition,
E) from 0 to 30% by weight of an impact-modifying rubber and
F) from 0 to 25% by weight of a flameproofing agent.

The present invention furthermore relates to the use of these molding materials for the production of moldings and to the moldings obtainable using these molding materials as essential components.

DE-A 22 26 932 discloses glass fiber-reinforced polyamide molding materials which additionally contain inorganic pigments such as zinc sulfide.

WO 85/05372, EP-A 260 123, WO 87/05304, EP-A 46 040, WO 86/02086 and DE-A-34 43 154 disclose blends of modified polyphenylene ethers and polyamides which may additionally contain fillers.

Fibrous or particulate fillers in mixtures of polyphenylene ethers and polyamides frequently have an adverse effect on the mechanical properties of the moldings. This is particularly true for fiber-reinforced, pale-colored moldings containing titanium dioxide as a white pigment due to the yellowish natural hue of these blends.

This white pigment has good hiding power, but has a drastic effect on the mechanical properties and causes nonuniform color surfaces.

It is therefore an object of the present invention to provide thermoplastic molding materials which have good elongation at brea-k, tensile- strength and toughness and in which the color impression of the pale-colored molding surfaces should be uniform.

We have found that this object is achieved by the molding materials defined at the outset.

The subclaims deal with preferred materials of this type and their use.

The polyamides present in the materials as component A) are known per se and include partially crystalline and amorphous resins having molecular weights (weight averages) of 5000 or more, usually known as nylon. Polyamides of this type are described, for example, in U.S. Pat. Nos. 2,071,250, 2,071,251, 2,130,523, 2,130,948, 2,241,322, 2,312,966, 2,512,606 and 3,393,210.

The polyamides can be prepared, for example, by condensing equimolar amounts of a saturated or aromatic dicarboxylic acid having from 4 to 12 carbon atoms with a saturated or aromatic diamine having up to 14 carbon atoms or by condensing ω-aminocarboxylic acids or by polyaddition of lactams.

Examples of polyamides are polyhexamethyleneadipamide (nylon 66), polyhexamethyleneazalaamide (nylon 69), polyhexamethylenesebacamide (nylon 610), polyhexamethylenedodecanediamide (nylon 612), the polyamides obtained by ring opening of lactams, such as polycaprolactam and polylaurolactam, and poly-11-aminoundecanoic acid and polyamides made from di(p-aminocyclohexyl)methane, dodecanedioic acid and m-xylylenediamine.

It is also possible to use, according to the invention, polyamides prepared by copolycondensation of two or more of the abovementioned polymers or their components, e.g. copolymers made from adipic acid, isophthalic acid or terephthalic acid and hexamethylenediamine or copolymers made from caprolactam, terephthalic acid and hexamethylenediamine. Partially aromatic copolyamides of this type contain, as component a1), from 40 to 90% by weight of units derived from terephthalic acid and hexamethylenediamine. A small proportion of the terephthalic acid, preferably not more than 10% by weight of all the aromatic dicarboxylic acids employed, may be replaced by isophthalic acid or other aromatic dicarboxylic acids, preferably those in which the carboxyl is in the para-position.

In addition to the units derived from terephthalic acid and hexamethylenediamine, the partially aromatic copolyamides contain units derived from ε-caprolactam ($a_2$) and/or units derived from adipic acid and hexamethylenedimaine ($a_3$).

The proportion of units derived from ε-caprolactam is up to 50% by weight, preferably from 20 to 50% by weight, in particular from 25 to 40% by weight, while the proportion of units derived from adipic acid and hexamethylenediamine is up to 60% by weight, preferably from 30 to 60% by weight, in particular from 35 to 55% by weight.

The copolyamides may contain both units derived from ε-caprolactam and those derived from adipic acid and hexamethylenediamine; in this case, it must be ensured that the proportion of units which are free from aromatic groups is 10% by weight or more, preferably 20% by weight or more, but the ratio of units derived from ε-caprolactam to those derived from adipic acid and hexamethylenediamine is not subject to any particular limitation.

It has proven particularly advantageous for many applications to use polyamides containing from 50 to 80% by weight, in particular from 60 to 75% by weight, of units derived from terephthalic acid and hexamethylene-diamine (units $a_1$)) and from 20 to 50% by weight, preferable from 25 to 40% by weight, of units derived from ε-caprolactam (units $a_2$)).

The partially aromatic copolyamides can be prepared, for example, by the process described in EP-A- 129 195 and EP 129 196.

Preference is given to linear polyamides having a melting point of above 200° C.

Preferred polyamides are polyhexamethyleneadipamide, polyhexamethylenesebacamide, polycaprolactam, nylon 6/6T and nylon 66/6T. The polyamides generally have a relative viscosity of from 2.0 to 5, determined in 1% strength by weight solution in 96% sulfuric acid at 23° C., corresponding to a molecular weight of from about 15,000 to 45,000. Preference is given to polyamides having a relative viscosity of from 2.4 to 3.5, in particular from 2.5 to 3.4.

Other examples of polyamides are those obtainable, for example, by condensing 1,4-diaminobutane with adipic acid at elevated temperature (nylon 4,6). Preparation processes for polyamides of this structure are described, for example, in EP-A 38 094, EP-A-38 582 and EP-A-39 524.

The proportion of polyamides A) in the molding materials according to the invention is from 10 to 84% by weight, preferably from 10 to 76% by weight, in particular from 20 to 50% by weight.

The molding materials according to the invention contain, as component B), from 10 to 84% by weight, preferably from 10 to 76% by weight, in particular from 20 to 50% by weight, of a modified polyphenylene ether.

Polyphenylene ethers generally have a molecular weight (weight average) in the range from 10,000 to 80,000, preferably from 20,000 to 60,000.

This corresponds to a reduced specific viscosity $\eta_{red}$ of from 0.2 to 0.9 dl/g, preferably from 0.35 to 0.8 dl/g, in particular from 0.45 to 0.6 dl/g, measured in 1% strength by weight solution in chloroform at 25° C. in accordance with DIN 53 726.

The unmodified polyphenylene ethers b ) are known per se and are preferably prepared by oxidative coupling of o-disubstituted phenols.

Examples of substituents are halogen atoms, such as chlorine or bromine, and alkyl radicals having from 1 to 4 carbon atoms and preferably containing no α-tertiary hydrogen, e.g. methyl, ethyl, propyl or butyl. The alkyl radicals may in turn be substituted by halogen, such as chlorine or bromine, or by hydroxyl. Further examples of possible substituents are alkoxy, preferably having up to 4 carbon atoms, or phenyl which is unsubstituted or substituted by halogen and/or alkyl. Copolymers of different phenols, for example copolymers of 2,6-dimethylphenol and 2,3,6-trimethylphenol, are also suitable. It is of course also possible to employ mixtures of different polyphenylene ethers.

Preferred polyphenylene ethers are those which are compatible with vinyl-aromatic polymers, i.e. are fully or substantially soluble therein (cf. A. Noshay, Block Copolymers, pages 8 to 10, Academic Press, 1977, and 0. Olabisi, Polymer-Polymer Miscibility, 1979, pages 117 to 189).

Examples of polyphenylene ethers are poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4-polyphenylene) ether, poly(2-methoxy-6-ethoxy-1,4-phenylene) ether, poly(2-ethyl-6-stearyloxy-1,4-phenylene) ether, poly(2,6-dichloro-1,4-phenylene)ether, poly(2-methyl-6-phenylene-1,4-phenylene) ether, poly(2,6-dibenzyl-1,4-phenylene) ether, poly(2-ethoxy-1,4-phenylene) ether, poly(2-chloro-1,4-phenylene) ether and poly(2,5-dibromo-1,4-phenylene) ether. Preference is given to polyphenylene ethers in which the substituents are alkyl having from 1 to 4 carbon atoms, such as poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether and poly(2-ethyl-6-propyl-1,4-phenylene) ether.

Graft polymers made from polyphenylene ethers and vinyl-aromatic polymers such as styrene, α-methylstyrene, vinyltoluene and chlorostyrene are also suitable.

Functionalized or modified polyphenylene ethers B) are known per se, for example from WO-A 86/02086, WO-A 87/00540, EP-A-222 246, EP-A-223 116 and EP-A-254 048.

The polyphenylene ether $b_1$) is usually modified by incorporating one or more carbonyl, carboxylic acid, acid anhydride, acid amide, acid imide, carboxylic acid ester, carboxylate, amino, hydroxyl, epoxy, oxazoline, urethane, urea, lactam or halobenzyl groups, thus ensuring adequate compatibility with the 2nd polymer of the mixture, the polyamide.

The modification is generally carried out by reacting a polyphenylene ether $b_1$) with a modifier containing one or more of the abovementioned groups, in solution (WO-A 86/2086), in aqueous dispersion, in the gas phase (EP-A-25 200) or in the melt, if desired in the presence of suitable vinyl-aromatic polymers or impact modifiers, it also being possible for free-radical initiators to be present.

Examples of suitable modifiers ($b_3$) are maleic acid, methyl maleate, itaconic acid, tetrahydrophthalic acid, the anhydrides and imides thereof, fumaric acid, the monoesters and diesters of these acids, for example of $C_1$- and $C_2$–$C_8$-alkanols (monomers $b_{31}$), the monoamides and diamides of these acids, such as N-phenyl-maleimide (monomers $b_{32}$), maleic hydrazide, the acyl chloride of trimellitic anhydride, benzene-1,2-(dicarboxylic anhydride)-4-carboxylic acid) (acetic anhydride), chloroethanoylsuccinaldehyde, chloroformyl-succinaldehyde, citric acid and hydroxysuccinic acid. Examples of monomers $b_{33}$) are N-vinylpyrrolidone and (meth)acryloylcaprolactam.

The preferred component B) in the molding materials according to the invention is a modified polyphenylene ether obtainable by reacting $b_1$) from 9.95 to 99.94% by weight of an unmodified polyphenylene ether, $b_2$) from 0 to 90% by weight of a vinyl-aromatic polymer, $b_3$) from 0.05 to 10% by weight of one or more compounds from the group formed by $b_{31}$) an α,β-unsaturated dicarbonyl compound, $b_{32}$) an amide-containing monomer having a polymerizable double bond and $b_{33}$) a lactam-containing monomer having a polymerizable double bond, $b_4$) from 0 to 80% by weight of other graft-active monomers and $b_5$) from 0.01 to 0.09% by weight of a free-radical initiator, the percentages by weight being based on the sum of $b_1$) to $b_5$), for from 0.5 to 15 minutes at from 240° to 375° C. in a suitable mixer and kneader, such as a twin-screw extruder.

The vinyl-aromatic polymer ($b_2$) should preferably be compatible with the polyphenylene ether employed.

The molecular weight of these conventional polymers is generally in the range from 1500 to 2,000,000, preferably in the range from 70,000 to 1,000,000.

Examples of preferred vinyl-aromatic polymers which are compatible with polyphenylene ethers are given in the abovementioned monograph by Olabisi, pages 224 to 230 and 245. As representatives only, vinyl-aromatic polymers made from styrene, chlorostyrene, α-methylstyrene and p-methylstyrene are mentioned here; in minor amounts (preferably not more than 20% by weight, in particular not more than 8% by weight), comonomers such as (meth)acrylonitrile or (meth)acrylates may also participate in the synthesis. Particularly preferred vinyl-aromatic polymers are polystyrene and impact-modified polystyrene. It is of course also possible to employ mixtures of these polymers. The preparation is preferably carried out by the process described in EP-A-302 485.

If desired, further comonomers $b_4$) which react with or graft onto components $b_1$ and, if used, $b_2$) under the preparation conditions can also be employed in the preparation of the modified polyphenylene ether B. Examples which may be mentioned are acrylic acid, methacrylic acid, acrylates, methacrylates and vinyl-aromatic monomers such as styrene, α-methylstyrene and vinyl-toluene, to mention but a few.

The proportion of component $b_4$) is from 0 to 80% by weight, preferably from 0 to 45% by weight, in particular not more than 20% by weight, based on the sum of components $b_1$) to $b_5$). Particularly preferred molding materials contain no component $b_4$).

Examples of free-radical initiators ($b_5$) are: di(2,4-dichlorobenzoyl) peroxide, tert.-butyl peroxide, di(3,5,5-trimethylhexanoyl) peroxide, dilauroyl peroxide, didecanoyl peroxide, dipropionyl peroxide, dibenzoyl peroxide, tert.-butyl peroxy-2-ethylhexanoate, tert.-butyl peroxydiethylacetate, tert.-butyl peroxyisobutyrate, 1,1-di-tert.-butylperoxy-3,3,5-trimethylcyclohexane, tert.-butyl peroxyisopropylcarbonate, tert.-butyl peroxy-3,3,5-trimethylhexanoate, tert.-butyl peracetate, tert.-butyl perbenzoate, butyl 4,4-di-tert.-butyl peroxyvalerate, 2,2-di-tert.-butylperoxybutane, dicumyl peroxide, tert.-butylcumyl peroxide, 1,3-di(-tert.-butylperoxyisopropyl)benzene and di-tert.-butyl peroxide. Organic hydroperoxides, such as diisopropylbenzene monohydroperoxide, cumene hydroperoxide, tert.-butyl hydroperoxide, p-menthyl hydroperoxide and pinane hydroperoxide, and highly branched alkanes of the general structure

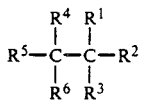

where $R_1$ to $R^6$ are alkyl having from 1 to 8 carbon atoms, alkoxy having from 1 to 8 carbon atoms, aryl, such as phenyl or naphthyl, or 5- or 6-membered heterocyclic rings having a π-electron system and nitrogen, oxygen or sulfur as heteroatoms, are also suitable. The substituents $R^1$ to $R^6$ may themselves contain functional groups as substituents, such as carboxyl, carboxyl derivatives, hydroxyl, amino, thiol or epoxide groups. Examples are 2,3-dimethyl-2,3-diphenylbutane, 3,4-dimethyl-3,4-diphenylhexane and 2,2,3,3-tetraphenylbutane.

The molding materials according to the invention contain, as component C), from 5 to 40% by weight, preferably from 20 to 35% by weight, of fibrous or particulate fillers or mixtures thereof. Examples of fillers are asbestos, carbon or glass fibers in the form of woven glass fabrics, glass mats or glass rovings, glass beads, talc, mica, barytes, kieselguhr, (calcined) kaolin and wollastonite.

Preferred fibrous reinforcing materials (component C) are carbon fibers, potassium titanate whiskers, aramid fibers and, particularly preferably, glass fibers. When glass fibers or carbon fibers are used, they may be provided with a size and coupling agent in order to impart better compatibility with the thermoplastic polyamide (A) or the polyphenylene ether (B). In general, the carbon fibers and glass fibers used have a diameter in the range from 6 to 20 μm.

These glass fibers can be incorporated either in the form of short glass fibers or continuous extrudates (rovings). In the finished injection molding, the mean length of the glass fibers is preferably in the range from 0.08 to 0.5 mm.

Suitable particulate fillers are amorphous silica, asbestos, magnesium carbonate, chalk, powdered quartz, mica, talc, feldspar and, in particular, calcium silicates such as wollastonite and kaolin (in particular calcined kaolin).

Surprisingly, the molding materials according to the invention have, as desired, very good tensile strength and elongation at break, even in the case of high proportions of fibrous fillers.

Examples of preferred combinations of fillers are 20% by weight of glass fibers with 15% by weight of wollastonite and 15% by weight of glass fibers with 15% by weight of wollastonite.

The molding materials according to the invention contain, as component D), from 1 to 20% by weight, preferably from 4 to 15% by weight, in particular from 5 to 10% by weight, of a zinc sulfide pigment.

The commercially available zinc sulfide white pigments generally contain 97% by weight or more of zinc sulfide in addition to small amounts of barium sulfate and zinc oxide.

They usually have a zinc blende or wurtzite structure, generally with a mean particle size of from 0.30 to 0.35 μm.

In general, the zinc sulfide pigment can easily be incorporated in powder form into the molding materials according to the invention. Concentrates of the zinc sulfide pigment, for example in a polyamide, are preferred since this allows better dispersion of the pigment.

It is of course also possible to employ small amounts of other dyes mixed with zinc sulfide in order to achieve various hues.

Examples are carbon black, black, colored and lustrous pigments, eg. chrome yellow or zinc yellow, pink red, cobalt blue, ultramarine, manganese violet, iron oxide red or strontium yellow, and organic pigments, e.g. azopigments, anthraquinoids, indigoids, dioxazine, quinacridone, phthalocyanine or isoindolinone pigments, whose proportion is preferably up to 55% by weight, in particular up to 40% by weight, based on the component D).

In addition to the essential components A), B), C) and D), the molding materials according to the invention can contain from 0 to 30% by weight, preferably from 0.5 to 3.5% by weight, of an impact-modifying rubber. Conventional impact modifiers E) which are suitable for polyamides (component A) and rubbers E) which are usually used for the impact modification of polyphenylene ethers B) can be used.

The preferred rubber-elastic polymers E) for polyamides A) are those which have reactive groups at the surface.

Examples of groups of this type are epoxy, carboxyl, latent carboxyl, amino or amide groups, and functional groups which can be introduced by carrying out the polymerization in the presence of monomers of the general formula

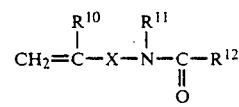

where the substituents can have the following meanings:
$R^{10}$ is hydrogen or $C_1$–$C_4$-alkyl,
$R^{11}$ is hydrogen, $C_1$–$C_8$-alkyl or aryl, in particular phenyl,
$R^{12}$ is hydrogen, $C_1$–$C_{10}$-alkyl, $C_6$–$C_{12}$-aryl or $OR^{13}$, $R^{13}$ is $C_1$–$C_8$-alkyl or $C_6$–$C_{12}$-aryl, which is unsubstituted or substituted by O- or N-containing groups, X is a chemical bond, $C_1$–$C_{10}$-alkylene, $C_6$–$C_{12}$-arylene or

Y is O-Z or NH-Z and

Z is $C_1$–$C_{10}$-alkylene or $C_6$–$C_{12}$-arylene.

The graft monomers described in EP-A 208 187 are also suitable for introducing reactive groups at the surface.

Examples of monomers using which the above-mentioned functional groups can be introduced are glycidyl methacrylate, glycidyl acrylate, allyl glycidyl ether, vinyl glycidyl ether, glycidyl itaconate, acrylic acid, methacrylic acid and the metal, in particular alkali metal, and ammonium salts thereof, maleic acid, fumaric acid, itaconic acid, vinylbenzoic acid, vinylphthalic acid, monoesters of these acids with alcohols ROH where R has up to 29 carbon atoms and is, for example, methyl, ethyl, propyl, isopropyl, n-butyl, i-butyl, hexyl, cyclohexyl, octyl, 2-ethylhexyl, decyl, stearyl, methoxyethyl, ethoxyethyl or hydroxyethyl. Although maleic anhydride and esters of acrylic acid or methacrylic acid with tertiary alcohols, for example tert.-butyl acrylate, do not have any free carboxyl groups, they behave in a similar manner to the free acids and are therefore regarded as monomers having latent acid groups.

Further examples are acrylamide, methacrylamide and substituted esters of acrylic acid or methacrylic acid, such as (N-t-butylamino)ethyl methacrylate, (N,N-dimethylamino)ethyl acrylate, (N,N-dimethylamino)methyl acrylate and (N,N-diethylamino)ethyl acrylate.

The proportion of groups derived from the above-mentioned monomers is generally from 0.5 to 40% by weight, preferably from 0.5 to 25% by weight, based on the total weight of the rubber.

These monomers can either by copolymerized with the other monomers during preparation of the rubber or grafted onto a pre-existing, unmodified rubber (if necessary in the presence of initiators, for example free-radical initiators).

The rubbers are generally polymers preferably built up from two or more of the following monomers as the principal components: ethylene, propylene, butadiene, isobutene, isoprene, chloroprene, vinyl acetate, styrene, acrylonitrile, (methy)acrylic acid and acrylates and methacrylates having from 1 to 18 carbon atoms in the alcohol component.

A first preferred group comprises the ethylene-propylene (EPM) and ethylene-propylene-diene (EPDM) rubbers, which preferably have an ethylene:propylene ratio in the range from 40:60 to 90:10.

The Mooney viscosities (ML1+4/100° C.) of uncrosslinked EPM and EPDM rubbers of this type (gel contents generally less than 1% by weight) are preferably in the range from 25 to 100, in particular from 35 to 90 (measured in accordance with DIN 53 523 on the large rotor after a running time of 4 minutes at 100° C.).

EPM rubbers generally have virtually no double bonds, while EPDM rubbers may contain from 1 to 20 double bonds per 100 carbon atoms.

Examples of diene monomers for EPDM rubbers are conjugated dienes, such as isoprene and butadiene, non-conjugated dienes having from 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, and mixtures thereof. Preference is given to hexadiene-1,5,5-ethylidenenorbornene and dicyclopentadiene. The diene content of the EPDM rubbers is generally from 0.5 to 50% by weight, in particular from 3 to 15% by weight, based on the total weight of the rubber.

EPM and EPDM rubbers are usually grafted with the abovementioned monomers carrying reactive groups, of which only acrylic acid, methacrylic acid and derivatives thereof, and maleic anhydride are mentioned here.

A further group of rubbers comprises copolymers of ethylene with esters of acrylic or methacrylic acid, for example the methyl, ethyl, propyl, n-, i- or t-butyl and 2-ethylhexyl esters. In addition, the rubbers may also contain the abovementioned reactive groups, for example in the form of dicarboxylic acids, derivatives of these acids, vinyl esters and vinyl ethers.

The ethylene content of the copolymers is generally in the range from 50 to 98% by weight, and the proportions of epoxide-containing monomers and of the acrylate and/or methacrylate are each in the range from 1 to 49% by weight.

Preference is given to olefin polymers comprising
from 50 to 98.9% by weight, in particular from 60 to 95% by weight, of ethylene,
from 0.1 to 20% by weight, in particular from 0.15 to 15% by weight, of glycidyl acrylate and/or glycidyl methacrylate, acrylic acid and/or maleic anhydride, and
from 1 to 45% by weight, in particular from 10 to 35% by weight, of n-butyl acrylate and/or 2-ethylhexyl acrylate.

The above-described ethylene copolymers can be prepared by conventional processes, preferably by random copolymerization under superatmospheric pressure and at elevated temperature. Appropriate processes are described in the literature.

The melt flow index of the ethylene copolymers is generally in the range from 1 to 80 g/10 min (measured at 190° C. under a load of 2.16 kg).

Suitable elastomers for the impact modification of polyamide are furthermore graft copolymers, containing reactive groups, with butadiene, butadiene/styrene, butadiene/acrylonitrile and acrylate rubbers as the graft base, as described, for example, in DE-A 16 94 173, DE-A 23 48 377, DE-A 24 44 584 and DE-A-27 26 256, in particular the ABS polymers, as described in DE-A-20 35 390, DE-A-22 48 242 and EP-A-22 216.

The rubber E may be a graft polymer comprising
from 25 to 98% by weight of an acrylate rubber having a glass transition temperature of below −20° C. as the graft base (base polymer) and
from 2 to 75% by weight of a copolymerizable, ethylenically unsaturated monomer whose homopolymers and copolymers have a glass transition temperature of greater than 25° C., as the graft shell.

The graft base is an acrylate or methacrylate rubber containing up to 40% by weight of further comonomers. The $C_1$–$C_8$-esters of acrylic acid or methacrylic acid and the halogenated derivatives thereof, and aromatic acrylates and mixtures thereof are usually employed. Specific examples of comonomers in the graft base are acrylonitrile, methacrylonitrile, styrene, α-methylstyrene, acrylamides, methacrylamides and vinyl $C_1$–$C_6$-alkyl ethers.

The graft base may be uncrosslinked or partially or fully crosslinked, which is achieved, for example, by copolymerizing preferably from 0.02 to 5% by weight, in particular from 0.05 to 2% by weight, of a crosslinking monomer containing more than one double bond. Suitable crosslinking monomers are described, for example, in DE-A 27 26 256 and EP-A 50 265.

Preferred crosslinking monomers are triallyl cyanurate, triallyl isocyanurate, triacryloylhexahydro-s-triazine and triallylbenzenes.

If the crosslinking monomers contain more than 2 polymerizable double bonds, it is advantageous to limit their amount to not more than 1% by weight, based on the graft base.

Highly suitable graft bases are emulsion polymers having a gel content of greater than 60% by weight (determined in dimethylformamide at 25 C by the method of M. Hoffmann, H. Krömer, R. Kuhn, Polymeranalytik, Georg-Thieme-Verlag, Stuttgart, 1977).

Other suitable graft bases are acrylate rubbers having a diene core, as described, for example, in EP-A 50 262.

Particularly suitable graft monomers are styrene, α-methylstyrene, acrylonitrile, methacrylonitrile and methyl methacrylate, or mixtures thereof, in particular those comprising styrene and acrylonitrile in the weight ratio from 1:1 to 9:1.

The reactive groups can be introduced into the graft copolymers by, for example, carrying out the preparation of the graft shell in the presence of the appropriate monomers. In this case, the proportion thereof in the graft monomer mixture is preferably from 0.5 to 30% by weight, in particular from 1 to 25% by weight. It is also possible to apply the appropriate monomers separately as the final graft shell.

The graft yield, i.e. the quotient of the amount of grafted-on monomers and the amount of graft monomers employed, is generally in the range from 20 to 90%.

Further suitable rubbers are those which are used for the impact modification of polyphenylene ethers B).

Examples which may be mentioned are thermoplastic rubbers, such as polybutadiene, polybutene, polyisoprene, acrylonitrile-butadiene, ethylene-propylene, polyester or ethylene rubbers, and elastomeric copolymers made from methylene and esters of (meth)acrylic acid, for example ethylene-butyl acrylate copolymers, furthermore ionomers, polyoctenylenes, graft rubbers having a graft core made from butadiene or isoprene or alkyl (meth)acrylates and a graft shell made from styrene and/or α-methylstyrene, and preferably styrene-butadiene block copolymers, including AB, ABA and ABAB block copolymers, which may also have indistinct transitions, star block copolymers and the like, analogous isoprene block copolymers and (partially) hydrogenated block copolymers. These rubbers can also be employed in the form of a graft with vinyl-aromatic monomers, such as styrene (EP-A 234 063 and U.S. patent application 4,681,915).

The rubbers E preferably have a glass transition temperature of below $-30°$ C., in particular below $-40°$ C.

It is of course also possible to employ mixtures of the abovementioned types of rubber.

The molding materials according to the invention may furthermore contain flameproofing agents F) in amounts of from 0 to 25% by weight, preferably from 1 to 15% by weight, based on the total weight of the molding materials.

All known flameproofing agents are suitable, eg. polyhalobiphenyl, polyhalobiphenyl ether, polyhalophthalic acid and derivatives thereof, polyhalooligocarbonates and polyhalopolycarbonates, the corresponding bromine compounds being particularly effective.

Examples of these are polymers of 2,6,2,,6,-tetrabromobisphenol A, of tetrabromophthalic acid, of 2,6-dibromophenol and of 2,4,6-tribromophenol and derivatives thereof.

A preferred flameproofing agent F) is elemental red phosphorus, which can generally be phlegmatized or coated with, for example, polyurethanes or other amino plastics. In addition, concentrates of red phosphorus in, for example, a polyamide, elastomer or polyolefin are also suitable.

Particular preference is given to 1,2,3,4,7,8,9,-10,13,13,14,14-dodecachloro-1,4,4a,5,6,6a,7,10,10a,11,-12,12a-dodecahydro-1,4:7,10-dimethanodibenzo(a,e)cyclooctane (Dechlorane ® Plus, Occidental Chemical Corp.) and, if desired, a synergist, for example antimony trioxide.

Other suitable phosphorus compounds are organophosphorus compounds, such as phosphonates, phosphinates, phosphinites, phosphine oxides, phosphines, phosphites or phosphates. A specific example is triphenylphosphine oxide, which can be used alone or mixed with hexabromobenzene or a chlorinated biphenyl or red phosphorus and, if desired, antimony oxide.

Typical preferred phosphorus compounds which can be used according to the present invention are those of the general formula

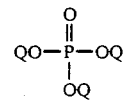

where Q is hydrogen or identical or different hydrocarbon radicals or halogenated hydrocarbon radicals, such as alkyl, cycloalkyl, aryl, alkyl-substituted aryl and aryl-substituted alkyl, with the proviso that one or more of the radicals Q is aryl. Examples of suitable phosphates of this type are phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethylhexyl) phenyl phosphate, tri(nonylphenyl) phosphate, phenyl methyl hydrogen phosphate, di(dodecyl) p-tolyl phosphate, tricresyl phosphate, triphenyl phosphate, dibutyl phenyl phosphate and diphenyl hydrogen phosphate. The preferred phosphates are those in which each Q is aryl. The most preferred phosphate is triphenyl phosphate. The combination of triphenyl phosphate with hexabromobenzene and antimony trioxide is also preferred.

Other suitable flameproofing agents are compounds which contain phosphorus-nitrogen bonds, such as phosphonitrile chloride, phosphoric acid ester amides, phosphoric acid ester amines, phosphoric acid amides, phosphonic acid amides, phosphinic acid amides, tris-(aziridinyl) phosphine oxide and tetrakis(hydroxymethyl)phosphonium chloride. The majority of these flame-inhibiting additives are commercially available.

Other suitable halogen-containing flameproofing agents are tetrabromobenzene, hexachlorobenzene, hexabromobenzene, and halogenated polystyrenes and polyphenylene ethers.

It is also possible to use the halogenated phthalimides described in DE-A-19 46 924, of which N,N'-ethylenebistetrabromophthalimide, in particular, has achieved importance.

In addition to the essential components A), B), C) and D) and, if desired, E) and F), the molding materials according to the invention can also contain conventional additives and processing aids, whose proportion is generally up to 20% by weight, preferably up to 10% by weight, based on the total weight of components A) to F).

Examples of conventional additives are stabilizers, antioxidants, thermal stabilizers, UV stabilizers, lubricants, mold release agents, dyes, pigments and plasticizers.

Examples of antioxidants and thermal stabilizers which can be added to the thermoplastic materials according to the invention are halides of metals of group I of the Periodic Table, eg. sodium halides, potassium halides and lithium halides, if desired in combination with copper(I) halides, eg. chlorides, bromides or iodides. It is also possible to use zinc fluoride, zinc chloride, stearically hindered phenols, hydroquinones, substituted representatives of this group, and mixtures of these compounds, preferably in concentrations of up to 1% by weight, based on the weight of the mixture.

Examples of UV stabilizers are various substituted resorcinols, salicylates, benzotriazoles and benzophenones, which are generally employed in amounts of up to 2% by weight.

Materials for increasing the screening against electromagnetic waves, such as metal flakes, metal powders, metal fibers and metal-coated fillers, can also be used.

Lubricants and mold release agents, which are generally added to the thermoplastic material in amounts of up to 1% by weight, are stearic acid, stearyl alcohol, alkyl stearates, alkyl stearamides and esters of pentaerythritol with long-chain fatty acids.

The additives also include stabilizers which prevent decomposition of the red phosphorus in the presence of moisture and atmospheric oxygen. Examples are compounds of cadmium, zinc, aluminum, silver, iron, copper, antimony, tin, magnesium, manganese, vanadium and boron. Examples of particularly suitable compounds are oxides of the metals mentioned, furthermore carbonates or oxycarbonates, hydroxides and salts of organic or inorganic acids, such as acetates, phosphates, hydrogen phosphates and sulfates.

The thermoplastic molding materials according to the invention can be prepared by conventional processes by mixing and subsequently extruding the starting components in conventional mixers, such as screw extruders, preferably twin-screw extruders, Brabender mills or Banburry mills, and kneaders. After extrusion, the extrudate is cooled and comminuted.

In order to obtain the most homogeneous molding material possible, vigorous mixing is necessary. To this end, mean mixing times of from 0.2 to 30 minutes at from 280° to 380° C. are generally necessary. The sequence of mixing of the components may be varied; for example, it is possible to pre-mix two or three components, or to mix all the components together. It may be advantageous to prepare the modified polyphenylene ether $b_2$ in a first zone of an extruder and to mix it with the other components of the molding material according to the invention in one or more subsequent zones. A process of this type is described in DE-A 37 02 582.

The molding materials according to the invention have good elongation at break combined with good tensile strength. In particular, the overall strength (flexural and tensile strength) is retained for a relatively long time in a stress/load cycle (increasing the number of cycles until break). The surface of the injection moldings is uniformly colored, ie. it has no matt points.

This property profile makes the moldings which can be produced from molding materials according to the invention particularly suitable for motor vehicle parts, sports equipment, and electronic and electrical components.

EXAMPLES

Component A1)

A random copolyamide comprising:
85% by weight of units of an equimolar mixture of hexamethylenediamine and adipic acid and
15% by weight of units derived from ε-caprolactam and having a Fikentscher K value of 69, measured in a 1% strength by weight solution of 96% strength by weight sulfuric acid at 25° C.

Component A2)

Polyhexamethyladipamide having a K value of 74, corresponding to a relative viscosity $\eta_{rel}$ of 2.8.

Component A3)

Poly-ε-caprolactam having a K value of 74.

Component (B1)

A modified polyphenylene ether comprising
88.5% by weight of poly(2,6-dimethyl-1,4-phenylene) ether ($\eta_{red}=0.62$, measured in a 1% strength by weight solution in chloroform at 25° C.),
10% by weight of polystyrene (melt flow index MFI at 200° C. and a load of 5 kg:24 g/10 min)
1.45% by weight of fumaric acid and
0.05% by weight of 3,4-dimethyl-3,4-diphenylhexane (initiator)
was prepared by mixing the components at from 290° to 310° C. in a twin-screw extruder with subsequent degassing. The melt was passed through a water bath, granulated and dried.

Component (B2)

A modified polyphenylene ether comprising
38% by weight of poly(2,6-dimethyl-1,4-phenylene) ether ($\eta_{red}=0.62$, measured in a 1% strength by weight solution in chloroform at 25° C.),
10% by weight of polystyrene (melt flow index MFI at 200° C. and a load of 5 kg: 24 g/10 min),
1.95% by weight of maleic anhydride and
0.05% by weight of 3,4-dimethyl-3,4-diphenylhexane (initiator)
was prepared by mixing the components at from 290° to 310° C. in a twin-screw extruder with subsequent degassing. The melt was passed through a water bath, granulated and dried.

Component (B1*) (for comparison)

An unmodified polyphenylene ether having a mean molecular weight (weight average) $M_w$ of 30,000

Component (C1)

Glass fibers (with polyurethane size) having a mean diameter of 15 μm.

Component (C2)
Wollastonite having a specific surface area (in accordance with DIN 66 132) of 2 m²/g.

Component D1)
Zinc sulfide white pigment having a mean particle size of 0.35 μm.

Component D1*)
Titanium dioxide (rutile type) having a mean particle size of 0.28 μm.

Component E)
A styrene-butadiene-styrene three-block copolymer having a styrene content of 30% by weight.

Component (F)
Red phosphorus having a mean particle size ($d_{50}$) of 45 μm.

Preparation of the molding materials

Components A), B), C) and D) and, if desired, E) and F) were mixed in a twin-screw extruder at a barrel temperature of 290° C. The melt was passed through a water bath and granulated. The dried granules were injection-molded at 290° C. to form small standard specimens, dumbbell test specimens and circular disks.

The tensile strength (tensile modulus and modulus of elasticity) were determined in accordance with DIN 53 457, the impact strength in accordance with DIN 53 455 and the elongation at break in accordance with DIN 53 455.

The color impression of the moldings was compared visually on circular disks injection molded at a material temperature of 300° C. and a mold surface temperature of 95° C.: uniform color impression +; nonuniform color impression −.

The resistance measurements under dynamic load were carried out using a three-point bending pulsating test with small standard specimens (4×6×50 mm) according to DIN 53452. The sample supports and piston comprised cylindrical steel rollers (diameter: 10 mm), with the distance between the support centers being 42 mm. The test was carried out at three deflection levels of 1.5 mm, 2.0 mm and 2.5 mm. The sinusoidal, pulsating test load was in each case applied at 23° C. at an upper load:lower load ratio of R=0.25 and a test frequency of 5 Hz. The quantity being measured was the number of load cycles at which the flexural force measured had dropped to half its initial value (lower load measured).

The composition of the molding materials and the results of the measurements are shown in the tables.

TABLE 1

| No. | Composition [% by weight] | | | | | | Modulus of elasticity [N/mm²] | Elongation at break [%] | Surface quality |
|---|---|---|---|---|---|---|---|---|---|
| 1 | 31 A2) | 29 B1) | 30 C1) | 4 D1) | 6 E) | — | 10,400 | 3.8 | + |
| 2** | 38 A2) | 28 B2) | 20 C2) | 6 D1) | 7.5 E) | — | 2,600 | 18 | + |
| 3 | 32 A2) | 32 B1) | 20 C2) | 6 D1) | 6.5 E) | 3.5 F) | 2,800 | 15 | + |
| 4* | 36 A1) | 32 B1*) | 20 C1) | 5 D1*) | — | — | 7,500 | 3.9 | — |
| 5* | 31 A2) | 29 B1*) | 30 C1) | 4 D1*) | 6 E) | — | 10,400 | 3.1 | — |
| 6* | 38 A2) | 28 B1*) | 20 C2) | 6 D1*) | 7.5 E) | — | 2,600 | 5.8 | — |

*) For comparison (Example 4 additionally contained 7% by weight of a styrene-maleic acid copolymer (97.2:2.8) of viscosity number 0.76 dl/g, measured in 0.5% strength by weight solution in dimethylformamide (25° C.), as phase-compatibility promoter.
**) Example 2 additionally contained 0.5% by weight of carbon black.

TABLE 2

| No. | Composition [% by weight] | | | | | Impact strength [kJ/m²] | Tensile modulus [N/mm²] |
|---|---|---|---|---|---|---|---|
| 7 | 31 A2) | 29 B1) | 30 C1) | 4 D1) | 6 E) | 31 | 140 |
| 8* | 32 A2) | 30 B1) | 30 C1) | 2 D1*) | 6 E) | 19 | 113 |
| 9* | 64 A3) | — | 34 C2) | 2 D1) | — | 49 | 174 |
| 10*) | 65 A3) | — | 34 C1) | 1 D1*) | — | 34 | 143 |

*) For comparison, Examples 9* and 10* in accordance with DE-A-22 26 932

TABLE 3

| | Deflection level [mm] | Number of load cycles |
|---|---|---|
| Composition Example 1 | 2.5 | 380 |
| Composition Example 1 | 2.0 | 2654 |
| Composition Example 1 | 1.5 | 33310 |
| Composition Comparative Example 5* | 2.5 | 75 |
| Composition Comparative Example 5* | 2.0 | 754 |
| Composition Comparative Example 5* | 1.5 | 4060 |

We claim:

1. A filler-containing thermoplastic molding material containing, as essential components,
   A) from 10 to 84% by weight of a thermoplastic polyamide,
   B) from 10 to 84% by weight of a modified polyphenylene ether, modified by one or more carbonyl, carboxylic, acid, acid anhydride, acid amide, acid imide, carboxylic acid ester, carboxylate, amino, hydroxyl, epoxy, oxazoline, urethane, urea, lactam or halobenzyl groups,
   C) from 5 to 40% by weight of a fibrous or particulate filler or a mixture thereof, and
   D) from 1 to 20% by weight of a zinc sulfide pigment, and, in addition,
   E) from 0 to 30% by weight of an impact-modifying rubber and
   F) from 0 to 30% by weight of a flameproofing agent.

2. A filler-containing thermoplastic molding material as claimed in claim 1, containing
   from 10 to 76% by weight of A),
   from 10 to 76% by weight of B),
   from 10 to 35% by weight of C) and
   from 4 to 15% by weight of D).

3. A filler-containing thermoplastic molding material as claimed in claim 1, in which component B) is a modified polyphenylene ether prepared from $b_1$) from 9.95 to 99.94% by weight of a polyphenylene ether,
   $b_2$) from 0 to 90% by weight of a vinyl-aromatic polymer,
   $b_3$) from 0.05 to 10% by weight of one or more compounds from the group formed by $b_{31}$) an $\alpha,\beta$-unsaturated dicarbonyl compound,
$b_{32}$) an amide-containing monomer having a polymerizable double bond and
$b_{33}$) a lactam-containing monomer having a polymerizable double bond,
$b_4$) from 0 to 80% by weight of further acrylic acid, methacrylic and, acrylates, methacrylates or vinyl aromatic graft-active monomers and
$b_5$) from 0.01 to 0.09% by weight of a free-radical initiator.

4. A filler-containing thermoplastic molding material as claimed in claim 1, in which the filler comprises glass fibers, wollastonite, carbon fibers or a mixture thereof.

5. A molding obtainable from a thermoplastic molding material as claimed in claim 1.

* * * * *